United States Patent
Nishizaki et al.

(10) Patent No.: US 6,449,543 B2
(45) Date of Patent: Sep. 10, 2002

(54) STEERING DEVICE FOR VEHICLE

(75) Inventors: Katsutoshi Nishizaki, Nabari; Shiro Nakano, Osaka; Takanobu Takamatsu, Habikino; Masaya Segawa, Tenri, all of (JP)

(73) Assignee: Koyo Seiko Co., Ltd., Osaka (JP)

( * ) Notice: Subject to any disclaimer, the term of this patent is extended or adjusted under 35 U.S.C. 154(b) by 76 days.

(21) Appl. No.: 09/760,991

(22) Filed: Jan. 16, 2001

(30) Foreign Application Priority Data

Jan. 31, 2000 (JP) ........................................ 2000-022690

(51) Int. Cl.$^7$ .............................. B62D 5/00; B62D 5/04; B62D 6/00
(52) U.S. Cl. ............................... 701/41; 701/1; 701/72; 180/6.2; 180/6.6; 180/6.44
(58) Field of Search ................................ 701/41, 72, 1; 180/6.2, 6.24, 6.28, 6.44, 6.6, 6.62

(56) References Cited

U.S. PATENT DOCUMENTS

| | | | | |
|---|---|---|---|---|
| 5,483,446 A | * | 1/1996 | Momose et al. ................ 701/1 |
| 5,636,121 A | * | 6/1997 | Tsuyama et al. .............. 701/70 |
| 5,762,157 A | * | 6/1998 | Uehara ....................... 180/197 |
| 5,925,082 A | * | 7/1999 | Shimizu et al. ................ 701/41 |
| 6,053,270 A | * | 4/2000 | Nishikawa et al. ......... 180/168 |
| 6,208,921 B1 | * | 3/2001 | Tsunehara et al. ............. 701/41 |
| 6,219,609 B1 | * | 4/2001 | Matsuno et al. ............... 701/72 |
| 6,236,926 B1 | * | 5/2001 | Naitou ......................... 701/70 |
| 6,295,496 B1 | * | 9/2001 | Shinmura et al. ............. 701/48 |
| 6,308,122 B1 | * | 10/2001 | Nishizaki et al. ............. 701/41 |
| 6,321,159 B1 | * | 11/2001 | Nohtomi et al. ............ 701/207 |

* cited by examiner

Primary Examiner—William A. Cuchlinski, Jr.
Assistant Examiner—Olga Hernandez
(74) Attorney, Agent, or Firm—Jordan and Hamburg LLP

(57) ABSTRACT

In a steering device for vehicle, the movement of a steering actuator, which is driven in accordance with the rotating operation of an operating member, is transmitted to the vehicle wheels such that the steering angle changes without mechanically coupling the operating member to the wheels. A target yaw rate, which accords with a load torque, that is sum of the control torque generated by an operating actuator and driver operating torque, and an operating angle of the operating member resulting from the functioning of this load torque, are computed. The steering actuator is controlled such that the vehicle yaw rate follows the target yaw rate. The operating actuator is controlled such that the operating angle follows a target operating angle of the operating member corresponding to a behavior index value comprising at least yaw rate of the vehicle.

4 Claims, 15 Drawing Sheets

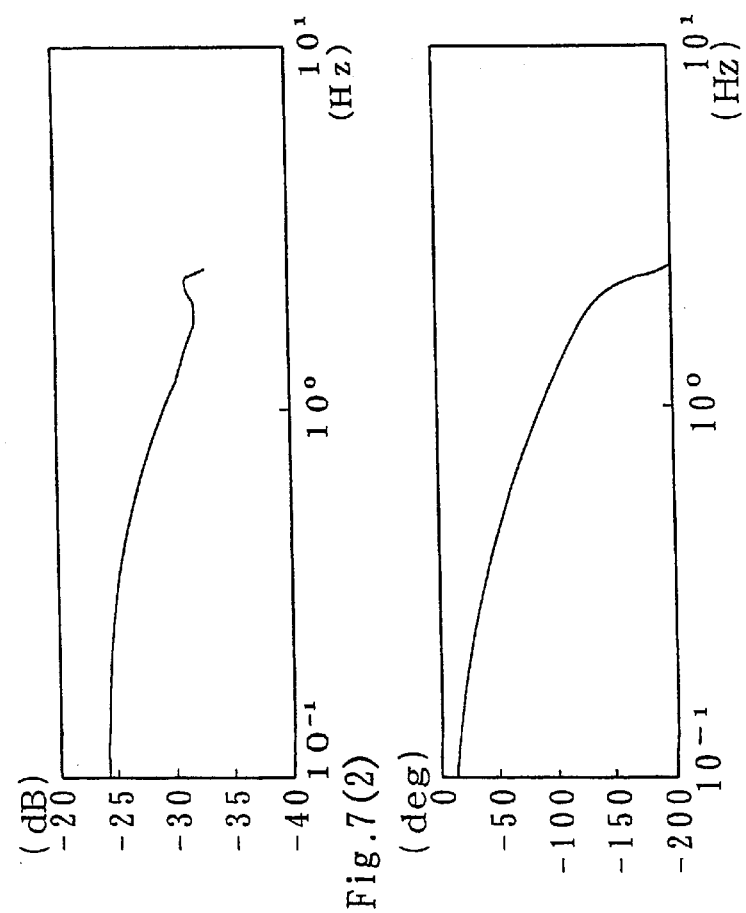
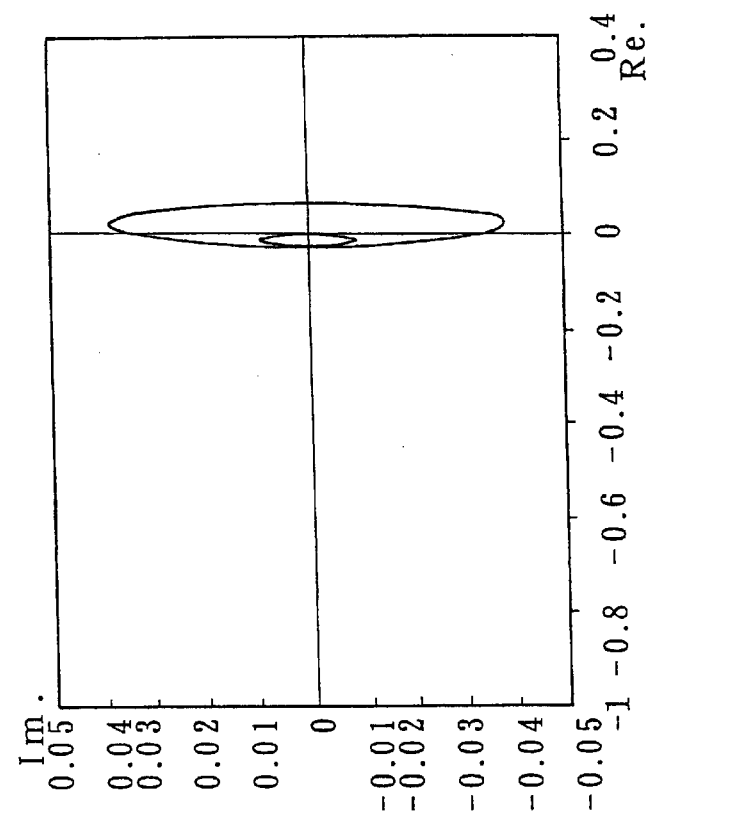
Fig.7(1)
Fig.7(2)
Fig.7(3)

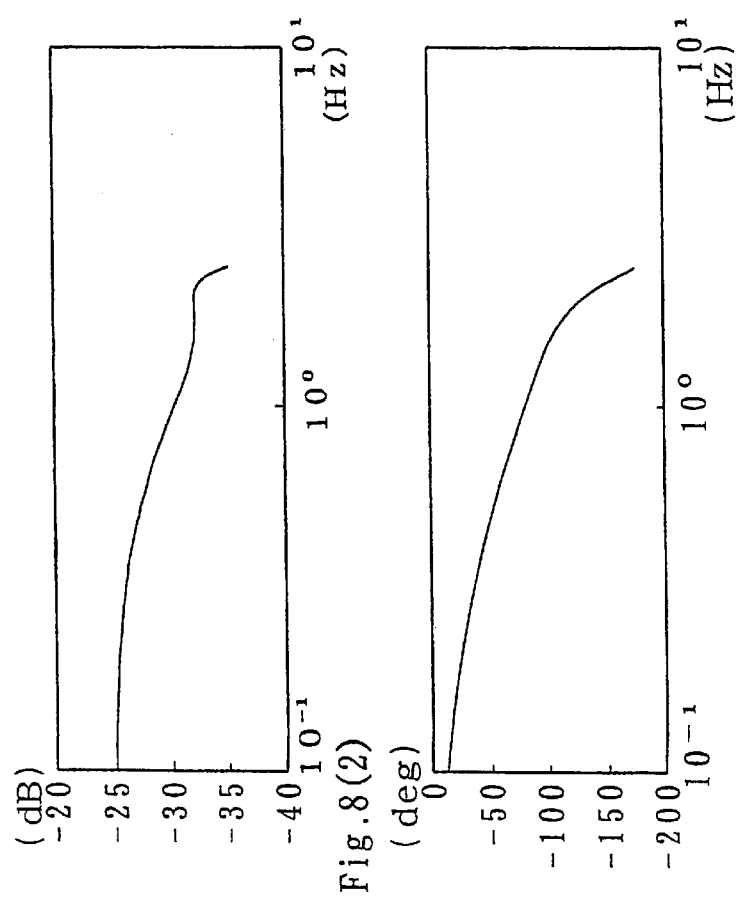
Fig.8(1)
Fig.8(2)
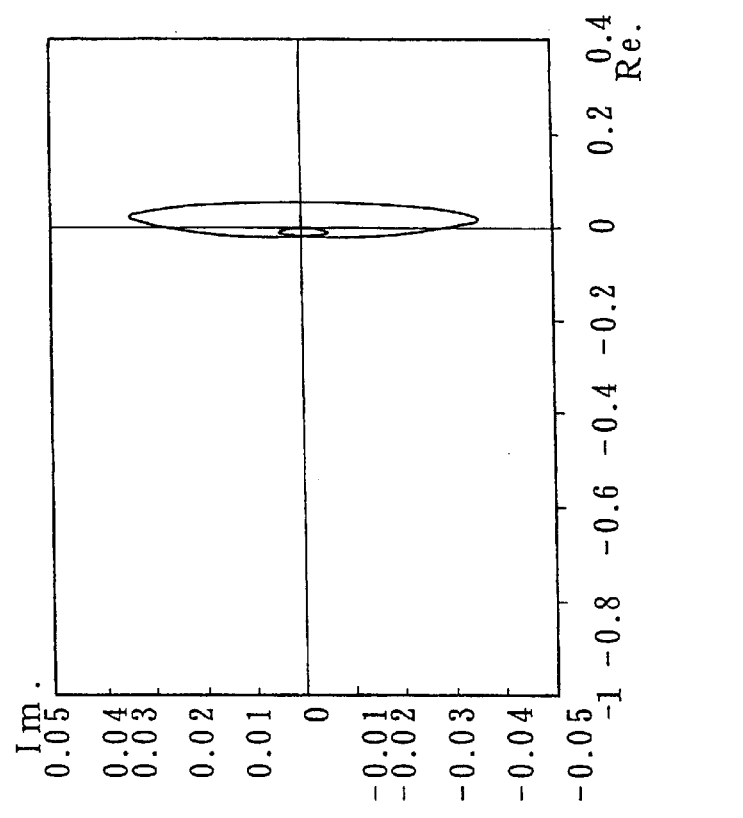
Fig.8(3)

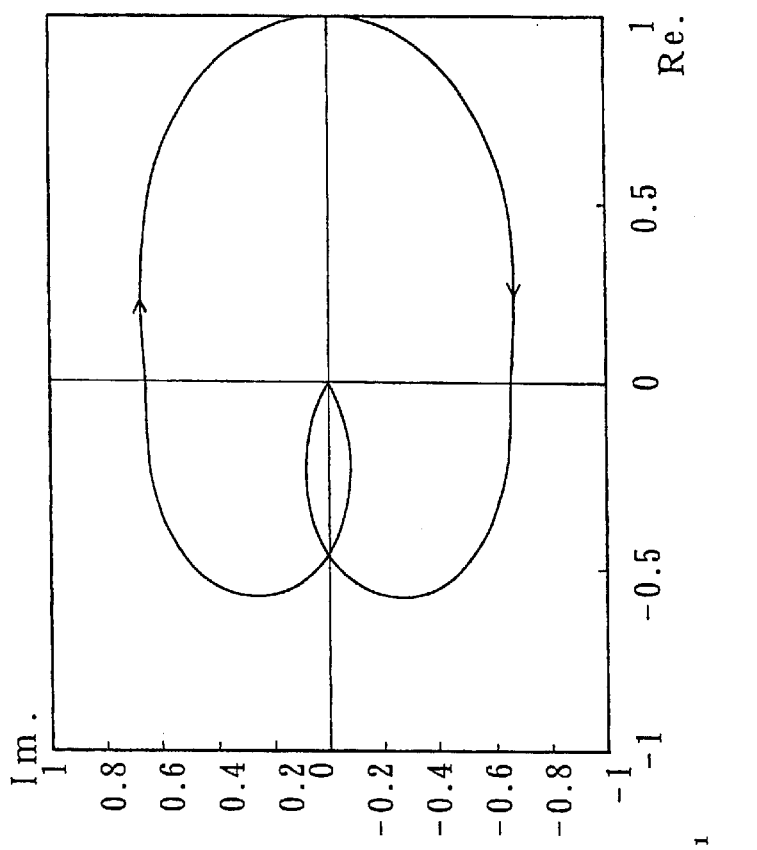
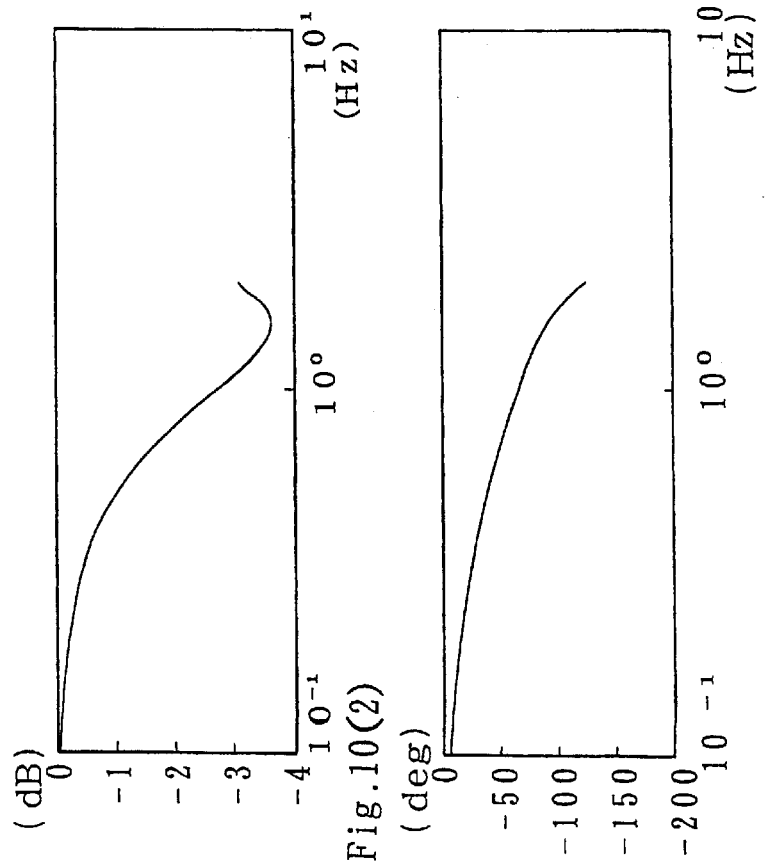
Fig.10(1)
Fig.10(2)
Fig.10(3)
Comparative Example

Fig.11 Comparative Example

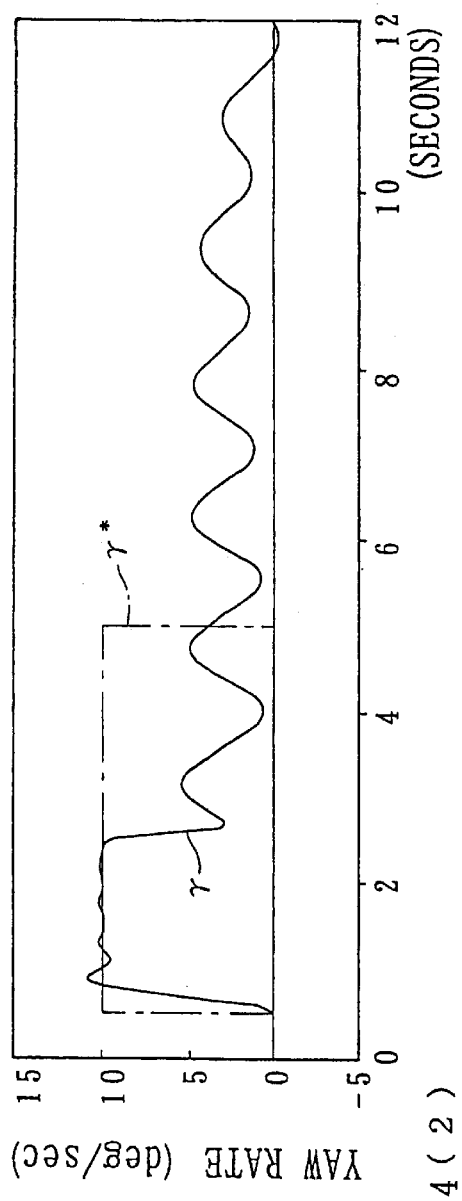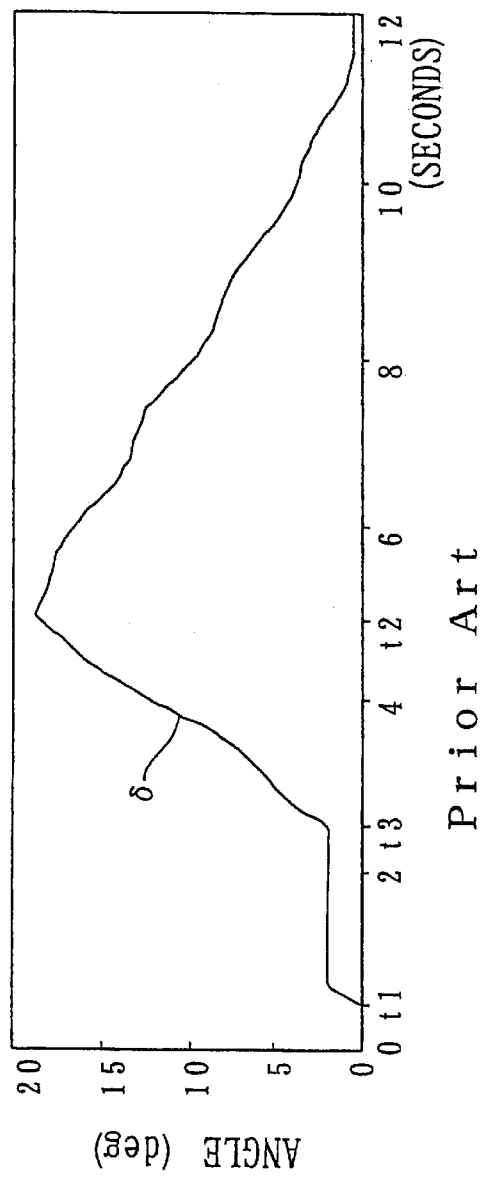

STEERING DEVICE FOR VEHICLE

FIELD OF THE INVENTION

The present invention relates to a steering device for vehicle, which utilizes a so-called steer by electric wire system.

DESCRIPTION OF THE RELATED ART

In a vehicle steering device that employs a steer by electric wire system, the movement of a steering actuator, which corresponds to the operation of an operating member modeled on a steering wheel, is transmitted to the wheels of the vehicle in such a manner that the steering angle changes without this operating member being coupled mechanically to the wheels. In a vehicle that employs a steer by electric wire system such as this, a proposal has been made for computing a target yaw rate corresponding to the amount of operation of the operating member, and controlling the steering actuator such that the target yaw rate coincides with the actual yaw rate so as to stabilize the behavior of the vehicle.

FIG. 13 shows an example of a control block diagram of a vehicle steering device employing a conventional steer by electric wire system.

In the control block diagram, K1 is the gain of a target yaw rate $\gamma^*$ relative to the operating angle $\delta h$ of an operating member 101, and a steering device computes a target yaw rate $\gamma^*$ from the stored relationship of $\gamma^* = K1 \cdot \delta h$, and an operating angle $\delta h$ detected by a sensor. K2 is the gain of a target steering angle $\delta^*$ relative to the deviation between the target yaw rate $\gamma^*$ and the actual yaw rate $\gamma$ of a vehicle 100, and a steering device computes a target steering angle $\delta^*$ from the stored relationship of $\delta^* = K2 \cdot (\gamma^* - \gamma)$, the computed target yaw rate $\gamma^*$, and a yaw rate $\gamma$ detected by a sensor. The gain K2 is regarded as a function of velocity V, and is set such that it decreases in line with an increase in velocity V in order to ensure stability at high speeds. Ga is the transfer function of the target drive current Ia* of the steering actuator 102 relative to the deviation between a target steering angle $\delta^*$ and the actual steering angle $\delta$ of the vehicle, and the steering device computes a target drive current Ia* from the stored relationship of Ia* = Ga·($\delta^* - \delta$), the computed target steering angle $\delta^*$, and a steering angle $\delta$ detected by a sensor. The transfer function Ga is set, for example, such that proportional integral (PI) control is performed. K3 is the gain of a target operating torque Th* relative to the operating angle $\delta h$ of operating member 101, and the steering device computes a target operating torque Th* from the stored relationship of Th* = K3·$\delta h$ and an operating angle $\delta h$ detected by a sensor. Gb is the transfer function of the target drive current Ib* of the operating actuator 103 relative to the deviation between the target operating torque Th* and the actual operating torque Th, and the steering device computes a target drive current Ib* from the stored relationship Ib* = Gb·(Th* − Th), the computed target operating torque Th* and an operating torque Th detected by a sensor. The transfer function Gb is set, for example, such that proportional integral (PI) control is performed.

In the above-mentioned conventional constitution, because the actual yaw rate $\gamma$ of a vehicle does not increase when the coefficient of friction between the surface of a road and the tires is reduced by surface icing, or when tire lateral force reaches its limit, a saturated state results in which the yaw rate $\gamma$ does not attain the target yaw rate $\gamma^*$ when operating torque Th increases, and there is a possibility of the steering angle $\delta$ diverging, and of vehicle behavior becoming unstable.

That is, FIG. 14 (1) and FIG. 14 (2) is one example of simulation results in a steering device constituting the above-mentioned conventional steer by electric wire system, showing changes over time in the yaw rate $\gamma$, target yaw rate $\gamma^*$ and steering angle $\delta$ relative to a step input of 2.7 N·m operating torque Th at times t1 to t2 (0.5 to 5 seconds), in a vehicle travelling at a velocity of 60 km/hour, wherein the coefficient of friction between the vehicle and the surface of the road is regarded as 1 up until t3 (2.5 seconds), and is regarded as 0.1 thereafter. The fact that the deviation between the yaw rate $\gamma$ and the target yaw rate $\gamma^*$ increases, and the steering angle $\delta$ diverges in accordance with the drop in the coefficient of friction is shown.

Further, FIG. 15 (1) and FIG. 15 (2) depict Bode diagrams showing an example of yaw rate $\gamma$ frequency response simulation relative to operating torque input in a steering device constituting the above-mentioned conventional steer by electric wire system, wherein a vehicle is travelling at a velocity of 20 km/hour. Further, FIG. 15 (3) and FIG. 15 (4) depict Bode diagrams showing an example of yaw rate $\gamma$ frequency response simulation relative to operating torque input in a conventional steering device in which a steering wheel is mechanically coupled to the vehicle wheels, wherein a vehicle is travelling at a velocity of 20 km/hour. FIG. 15 (1) through FIG. 15 (4) indicate that, at low travelling velocity, yaw rate responsiveness relative to operating torque input decreases more in a vehicle steering device employing a conventional steer by electric wire system than in a steering device in which a steering wheel is mechanically coupled to the vehicle wheels.

An object of the present invention is to provide a vehicle steering device capable of solving the above-mentioned problem.

SUMMARY OF THE INVENTION

A steering device for vehicle of the present invention comprises an operating member operated by being rotated; a steering actuator driven in accordance with the operation of the operating member; means for transmitting the movement of the steering actuator to wheels of the vehicle such that the steering angle changes in accordance with the movement without mechanically coupling the operating member to the wheels; an operating actuator for generating control torque, which acts on the operating member; means for determining a load torque, which is sum of the control torque and the operating torque exerted on the operating member by a driver; means for determining the operating angle of the operating member which is operated by the action of the load torque; means for computing a target behavior index value of the vehicle, comprising at least a target yaw rate corresponding to the determined load torque and operating angle based on a stored relationship between the load torque, operating angle, and target behavior index value; means for determining a value, comprising at least the yaw rate of the vehicle, as a behavior index value corresponding to change of behavior of the vehicle; means for controlling the steering actuator such that the determined behavior index value follows the target behavior index value; means for computing a target operating angle of the operating member corresponding to the determined behavior index value, based on a stored relationship between the behavior index value and the target operating angle; and means for controlling the operating actuator such that the determined operating angle follows the computed target operating angle.

According to the constitution of the present invention, the operating angle is generated by the operation of the operating member in accordance with the load torque, which is sum of the control torque outputted by the operating actuator and the operating torque inputted by the driver. This control torque functions so as to do away with the deviation between the operating angle and the target operating angle. Accordingly, in a case in which the operating angle has not attained the target operating angle, the control torque serves as an auxiliary force for the operation of the operating member, and in a case in which the operating angle has exceeded the target operating angle, the control torque serves as a reactive force against the operation of the operating member.

The steering actuator is controlled such that the behavior index value follows the target behavior index value corresponding to the operating angle and load torque. The vehicle behavior index value comprising the yaw rate changes in accordance with the control of the steering actuator. The target operating angle corresponds to the behavior index value comprising the yaw rate, and the operating angle corresponds to the target behavior index value.

Accordingly, in a case in which the behavior index value has not attained the target behavior index value, since the operating angle exceeds the target operating angle, the above reactive force against the operation of the operating member functions. In accordance therewith, in a case in which the yaw rate does not increase due to a drop in the coefficient of friction between the surface of the road and the tires, or tire lateral force having reached its limit even when the operating torque is increased, the reactive force against the operation of the operating member can be made to function. Even if the driver increases operating torque at this time, the operating torque increase can be offset by the increase of this reactive force, and the load torque acting on the operating member can be maintained approximately constant, preventing an increase of the target behavior index value corresponding to the load torque and operating angle. That is, because the operating angle and load torque, and in turn, the target behavior index value can be held in check by this reactive force, the divergence of the steering angle can be prevented, and vehicle behavior can be stabilized. Further, in a case in which a delay occurs in the behavior index value following the target behavior index value due to a delay in the response of the steering actuator relative to an operation input, because the above reactive force functions, it is possible to alleviate the wrong feeling resulting from the delayed response of this steering actuator, thus enabling improved steering feel.

It is desirable that lateral acceleration and velocity are determined in addition to yaw rate as the above-mentioned behavior index value, that the target operating angle has a component corresponding to a value arrived at by dividing the lateral acceleration by vehicle velocity, and a component corresponding to the value of the yaw rate, and that the ratio of the component corresponding to the value of the yaw rate in the target operating angle changes in accordance with the vehicle velocity. Furthermore, it is desirable that this ratio increase in accordance with an increase in vehicle velocity.

In accordance therewith, it is possible to control the steering device with accommodating to vehicle behavior characteristics, such that the yaw rate becomes smaller at low velocity by making the affect of lateral acceleration greater at low vehicle velocity, and making the affect of the yaw rate greater pursuant to an increase in vehicle velocity, in response to the target operating angle corresponding to the behavior index value.

Furthermore, it is possible to control the steering device with accommodating even closer to vehicle behavior characteristics by making it possible to change setting value of the vehicle velocity, at the time when the component corresponding to a value arrived at by dividing the lateral acceleration by vehicle velocity is equal to the component corresponding to the value of the yaw rate in the target operating angle.

According to the present invention, in a vehicle that employs a steer by electric wire system, it is possible to provide a steering device, which prevents vehicle behavior from becoming unstable and steering feel from deteriorating, by controlling the torque acting on the operating member in accordance with vehicle behavior and setting a target behavior index value in accordance with the torque acting on the operating member.

BRIEF DESCRIPTION OF THE DRAWINGS

FIG. 7 (1) and FIG. 7 (2) are Bode diagrams showing yaw rate response to operating torque input at a vehicle velocity of 60 km/hour in the steering device of the embodiment of the present invention, and FIG. 7 (3) is a Nyquist diagram;

FIG. 8 (1) and FIG. 8 (2) are Bode diagrams showing yaw rate response to operating torque input at a vehicle velocity of 100 km/hour in the steering device of the embodiment of the present invention, and FIG. 8 (3) is a Nyquist diagram thereof;

FIG. 10 (1) and FIG. 10 (2) are Bode diagrams showing yaw rate $\gamma$ response to a target yaw rate $\gamma^*$ at a vehicle velocity of 100 km/hour in the simulation model of a comparative example, and FIG. 10 (3) is a Nyquist diagram thereof;

FIG. 14 (1) is a diagram showing changes over time in the yaw rate and the target yaw rate relative to the step input of operating torque in the conventional steering device, and FIG. 14 (2) is a diagram showing changes over time in the steering angle relative to the step input of operating torque in the conventional steering device.

DESCRIPTION OF THE PREFERRED EMBODIMENT

Figure 1:
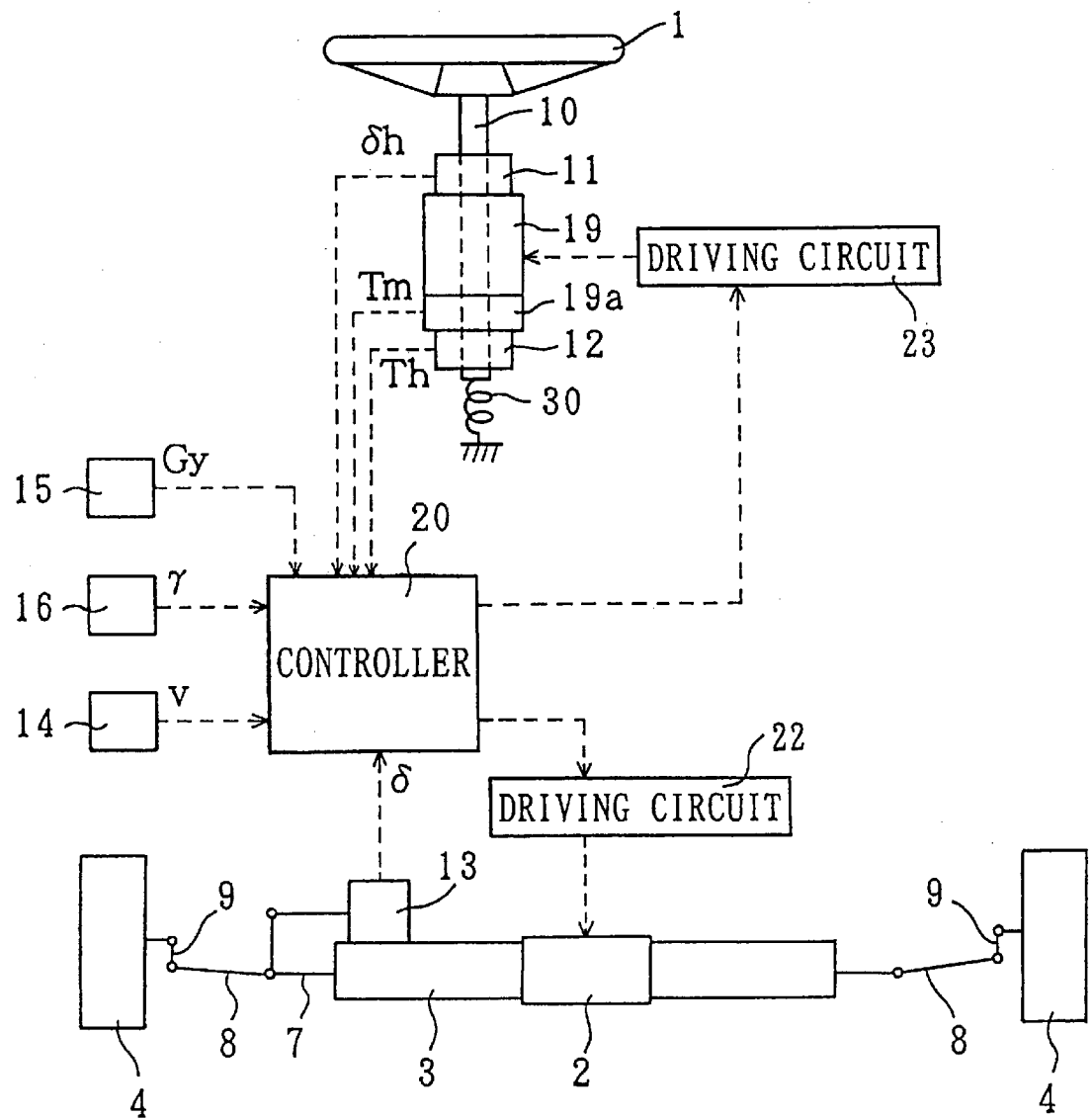
FIG. 1 is a block diagram illustrating a steering device of the embodiment of the present invention.

The vehicle steering device shown in FIG. 1 comprises an operating member 1 modeled on a steering wheel; a steering actuator 2 driven in accordance with the rotating operation of the operating member 1; and a steering gear 3 for transmitting the movement of the steering actuator 2 to the front left and right wheels 4 such that the steering angle changes in accordance with the movement without mechanically coupling the operating member 1 to the wheels 4.

The steering actuator 2 can be constituted from an electric motor, such as, for example, the well-known brushless motor. The steering gear 3 has a motion conversion mechanism for converting the rotary motion of the output shaft of this steering actuator 2 to the linear motion of a steering rod 7. The movement of this steering rod 7 is transmitted to the wheels 4 by way of tie rods 8 and knuckle arms 9, and the toe angle of the wheels 4 change. As for the steering gear 3, a well-known steering gear can be utilized, and as long as the motion of the steering actuator 2 can be transmitted to the wheels 4 such that the steering angle changes, the constitution thereof is not limited. Furthermore, in a state wherein the steering actuator 2 is not being driven, the wheel alignment is set such that the wheels 4 can return to the straight-forward steering position by self-aligning torque.

The operating member 1 is coupled to a rotating shaft 10, which is supported rotatably by the vehicle body. An operating actuator 19 for generating control torque that acts on this operating member 1 is provided. The operating actuator 19 can be constituted from an electric motor such as a brushless motor having an output shaft integrated together with the rotating shaft 10.

There is provided an elastic member 30 for providing elastic force in the direction in which the operating member 1 is made to return to a straight-forward steering position. This elastic member 30 can be constituted, for example, from a spring that provides the elastic force to the rotating shaft 10. When the above-mentioned operating actuator 19 is not furnishing torque to the rotating shaft 10, the operating member 1 can return to the straight-forward steering position in accordance with the elastic force.

There is provided an angle sensor 11 for detecting the rotation angle of the rotating shaft 10 as the operating angle of the operating member 1. The operating member 1 is operated by the action of load torque, which is sum of the control torque and operating torque exerted on the operating member 1 by the driver.

There is provided a torque sensor 12 for detecting torque transferred by the rotating shaft 10 as the operating torque, which is exerted on the operating member 1 by the driver.

A steering angle sensor 13 for detecting steering angle of the vehicle is constituted by a potentiometer, which detects the amount of movement of the steering rod 7 corresponding to the steering angle.

There is provided a velocity sensor 14 for detecting vehicle velocity as a vehicle behavior index value corresponding to change in the behavior of the vehicle.

There is provided a lateral acceleration sensor 15 for detecting lateral acceleration as a behavior index value.

There is provided a yaw rate sensor 16 for detecting yaw rate as a behavior index value.

There is provided an electric current sensor 19a for detecting load current of the operating actuator 19 as a value corresponding to the control torque Tm, which the operating actuator 19 generates.

The angle sensor 11, torque sensor 12, steering angle sensor 13, velocity sensor 14, lateral acceleration sensor 15, yaw rate sensor 16, and electric current sensor 19a are connected to a controller 20 constituted by a computer. The controller 20 controls the steering actuator 2 and the operating actuator 19 by way of driving circuits 22, 23.

Figure 2:
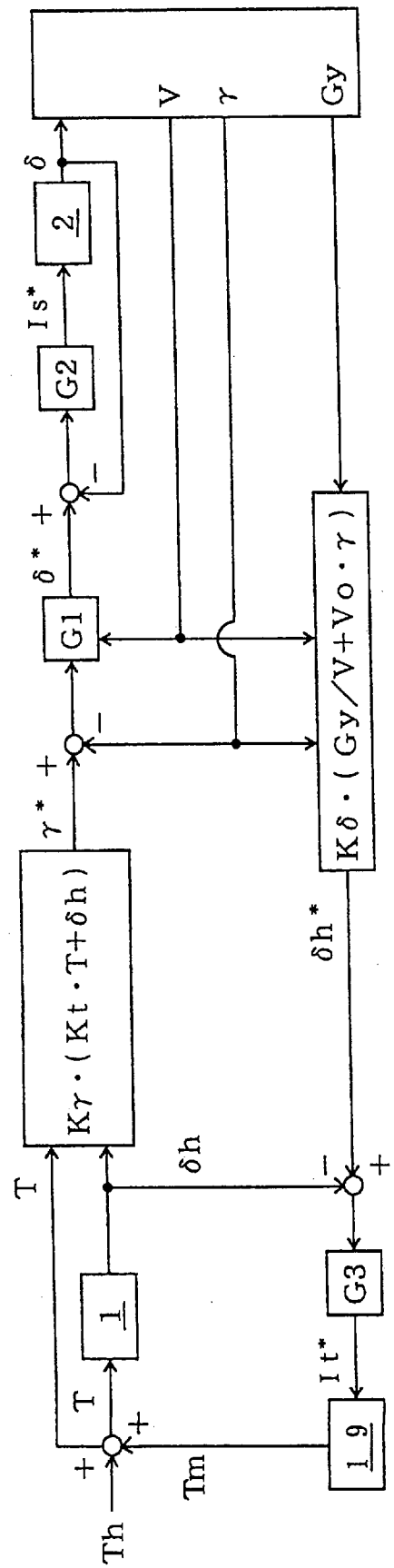
FIG. 2 is a control block diagram of the steering device of the embodiment of the present invention.

FIG. 2 shows a control block diagram of the above-mentioned constitution, and the symbols in the figure are as follows.

$\delta h$: Operating angle of the operating member 1

$\delta h^*$: Target operating angle of the operating member 1

$\delta$: Steering angle detected by the steering angle sensor 13

$\delta^*$: Target steering angle

Th: Driver operating torque detected by the torque sensor 12

Tm: Control torque generated by the operating actuator 19

T: Load torque of the operating member 1

$\gamma^*$: Target yaw rate $\gamma$: Vehicle yaw rate detected by the yaw rate sensor 16

V: Vehicle velocity detected by the velocity sensor 14

Gy: Lateral acceleration of the vehicle detected by the lateral acceleration sensor 15

Is*: Target driving current of the steering actuator 2

It*: Target driving current of the operating actuator 19

The controller 20 computes the load torque T, which is sum of the operating torque Th and the control torque Tm. The operating torque Th is detected by the above-mentioned torque sensor 12, and the control torque Tm is computed based on the load current detected by the above-mentioned electric current sensor 19a.

The controller 20 stores a predetermined relationship between the load torque T, operating angle $\delta h$ and target yaw rate $\gamma^*$ and based on this stored relationship, computes the target yaw rate $\gamma^*$ corresponding to the above-mentioned computed load torque T and detected operating angle $\delta h$. In this embodiment, the predetermined relationship is stored as the following expression having $K\gamma$ and Kt as coefficients of proportionality.

$$\gamma^* = K\gamma \cdot (Kt \cdot T + \delta h)$$

The coefficients of proportionality $K\gamma$, Kt are set so as to enable optimum control.

The controller 20 stores a predetermined relationship between the target yaw rate $\gamma^*$, yaw rate $\gamma$, and target steering angle $\delta^*$, and based on this stored relationship, computes the target steering angle $\delta^*$ corresponding to the above-mentioned computed target yaw rate $\gamma^*$ and detected yaw rate $\gamma$. In this embodiment, the predetermined relationship is a transfer function G1 of the target steering angle $\delta^*$ relative to the deviation $(\gamma^*-\gamma)$ between the target yaw rate $\gamma^*$ and detected yaw rate $\gamma$, and is expressed as G1=(Ka+Kb/s) such that PI control is performed, with having Ka as proportional gain, Kb as integral gain, and s as the Laplace operator. That is, the following expression is stored in the controller 20.

$$\delta^* = G1 \cdot (\gamma^* - \gamma)$$

Each gain Ka, Kb is set so as to enable optimum control. In this embodiment, the gains Ka, Kb are regarded as functions of vehicle velocity, and are set so as to decrease pursuant to an increase in vehicle velocity V in order to ensure stability at high speeds.

The controller 20 stores a predetermined relationship between the target steering angle $\delta^*$, steering angle $\delta$, and target driving current Is* of the steering actuator 2, and based on this stored relationship, computes the target driving current Is* corresponding to the above-mentioned computed target steering angle $\delta^*$ and detected steering angle $\delta$. The steering angle $\delta$ changes by the movement of the steering actuator 2 being driven in accordance with the target driving current Is*. In this embodiment, the predetermined relationship is a transfer function G2 of the target driving current Is* relative to the deviation $(\delta^*-\delta)$ between the target steering angle $\delta^*$ and detected steering angle $\delta$, and is expressed as G2=(Kd+Ke/s) such that PI control is performed, with having Kd as proportional gain, Ke as integral gain, and s as the Laplace operator. That is, the following expression is stored in the controller 20.

$$Is^* = G2 \cdot (\delta^* - \delta)$$

Each gain Kd, Ke is set so as to enable optimum control.

The controller 20 stores a predetermined relationship between the target operating angle $\delta h^*$ and the yaw rate $\gamma$, lateral acceleration Gy, and vehicle velocity V, which are the behavior index value of the vehicle, and based on this stored relationship, computes the target operating angle $\delta h^*$ corresponding to the detected yaw rate $\gamma$, detected lateral acceleration Gy and detected vehicle velocity V. In this embodiment, the predetermined relationship is stored as the following expression, in which $K\delta$ is a proportional constant and Vo is a crossover velocity.

$$\delta h^* = K\delta \cdot (Gy/V + Vo \cdot \gamma)$$

That is, the target operating angle $\delta h^*$ has an component $K\delta \cdot Gy/V$ corresponding to a value arrived at by dividing the lateral acceleration Gy by vehicle velocity V, and a component $K\delta \cdot Vo \cdot \gamma$ corresponding to the value of the yaw rate $\gamma$. The ratio of the component corresponding to the yaw rate $\gamma$ in the target operating angle $\delta h^*$ increases in accordance with increase in the vehicle velocity V. The coefficient of proportionality $K\delta$ is set so as to enable optimum control.

Figure 3:
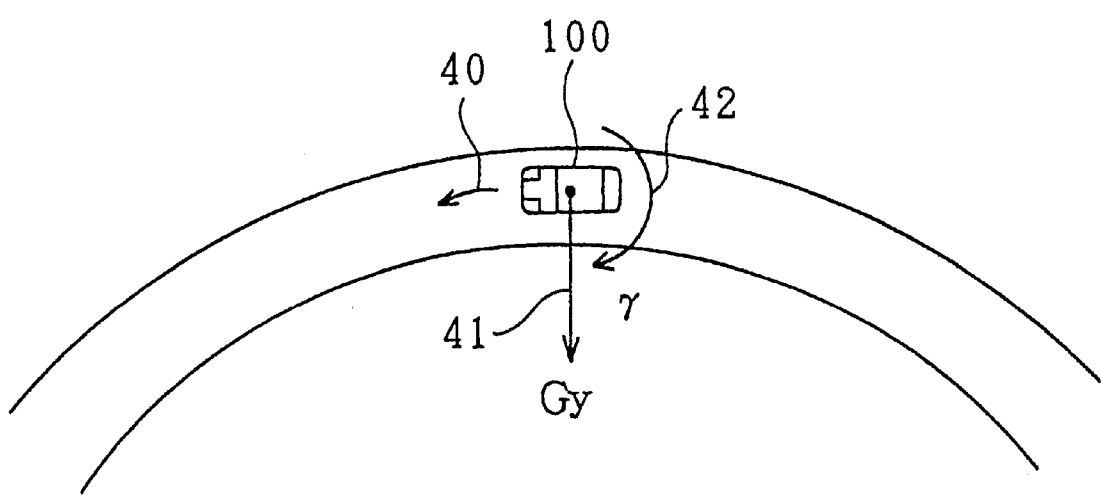
FIG. 3 is a diagram showing the state of a vehicle in a steady circular turning state.
Figure 4:
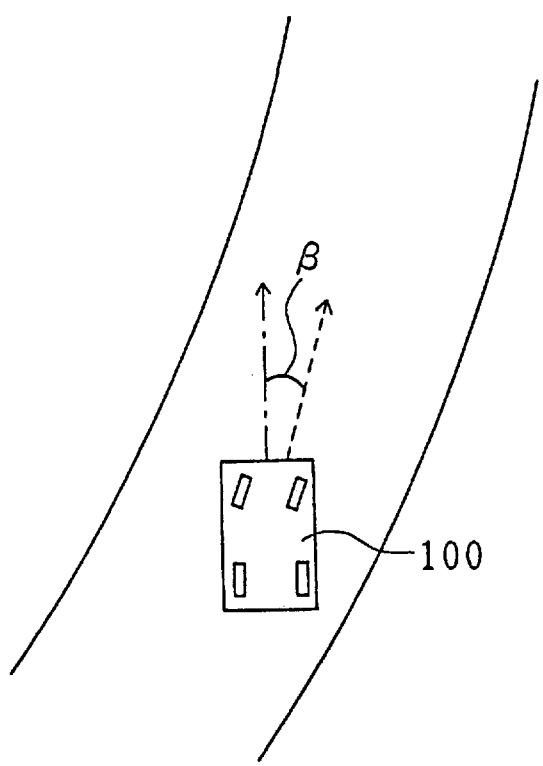
FIG. 4 (1) is a diagram showing the oversteer state of vehicle that is slipping sideways, and FIG. 4 (2) is a diagram showing the understeer state of a vehicle that is slipping sideways.
Figure 4:
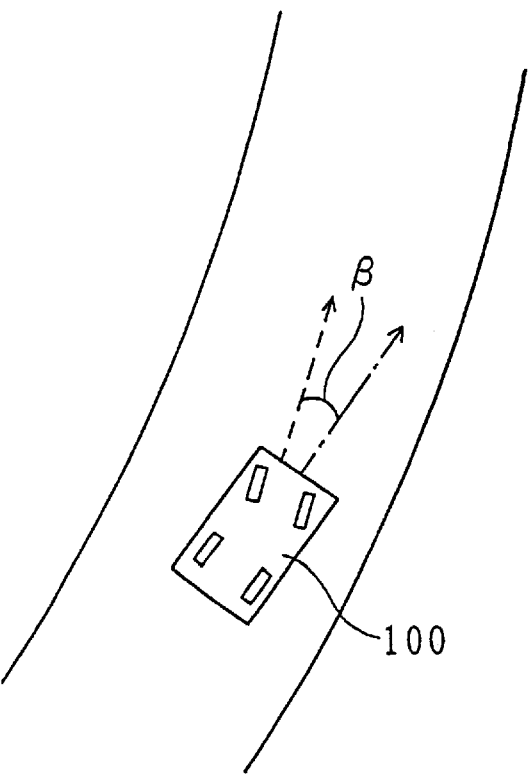

The crossover velocity Vo represents the yaw rate dependence factor in the control of the steering device. That is, in FIG. 3, for vehicle 100 turning at velocity V in the direction indicated by arrow 40, the relationship between the lateral acceleration Gy acting in the direction indicated by arrow 41 and the yaw rate $\gamma$ acting in the direction indicated by arrow 42 is approximated as $\gamma = Gy/V$, when the vehicle 100 is assumed to be in a steady turning state. Further, for a vehicle 100 which is slipping sideways in an oversteer state as shown in FIG. 4 (1), or for a vehicle 100 which is slipping sideways in an understeer state as shown in FIG. 4 (2), the angle formed by the center line of the body of the vehicle depicted as a dotted line paralleling the longitudinal direction of this vehicle 100, and the direction indicated by a broken line in which the vehicle 100 would advance if it were not sliding sideways, is regarded as vehicle sideslip angle $\beta$. The sideslip angle $\beta$ is approximately determined by a time integral value of $(Gy/V-\gamma)$, that is, by $\beta = \int (Gy/V-\gamma)\, dt$. Accordingly, if the vehicle velocity at which the sign of sideslip angle $\beta$ of the vehicle in a steady turning state changes from positive to negative is represented as $V_{NS}$, the sign of the sideslip angular velocity represented by $d\beta/dt$ $(=Gy/V-\gamma)$ also change at $V_{NS}$ up until the steady turning state is reached. That is, in a transient state, when vehicle velocity is lower than $V_{NS}$, Gy/V is larger than $\gamma$, while when vehicle speed is higher than $V_{NS}$, Gy/V is smaller than $\gamma$. Consequently, if Vo=1 in the expression of the target operating angle $\delta h^*$, the control based on the target operating angle $\delta h^*$ depends more on lateral acceleration than on yaw rate at a vehicle velocity slower than $V_{NS}$, and depends more on yaw rate than on lateral acceleration at a vehicle velocity faster than $V_{NS}$. For example, if Vo=1, the vehicle velocity at which the control based on the target operating angle $\delta h^*$ changes from lateral acceleration dependent state to yaw rate dependent state when vehicle velocity is increasing, that is, the vehicle velocity at the time when the component $K\delta \cdot Gy/V$ corresponding to a value arrived at by dividing the lateral acceleration Gy by vehicle velocity V is equal to the component $K\delta \cdot Vo \cdot \gamma$ corresponding to the value of the yaw rate $\gamma$ in the target operating angle $\delta h^*$ (herein-below referred to as the yaw rate dependent velocity Vc), becomes equal to $V_{NS}$. Further, if Vo>1, then Vc>$V_{NS}$, and if Vo<1, then Vc<$V_{NS}$. In this embodiment, the setting value of the yaw rate dependent velocity Vc is such that it is capable of being changed, by changing the crossover velocity Vo so as to enable optimum control.

The controller 20 stores a predetermined relationship between the target operating angle $\delta h^*$, operating angle $\delta h$, and target driving current It* of the operating actuator 19, and based on this stored relationship, computes the target driving current It* corresponding to the above-mentioned computed target operating angle $\delta h^*$ and detected operating angle $\delta h$. The control torque Tm is generated by the operating actuator 19 being driven in accordance with the target driving current It*. In this embodiment, the predetermined relationship is the transfer function G3 of the target driving current It* relative to the deviation $(\delta h^*-\delta h)$ between the target operating angle $\delta h^*$ and detected operating angle $\delta h$, and is expressed as G3=(Kg+Kh/s) such that PI control is performed, with having Kg as the proportional gain, Kh as the integral gain, and s as the Laplace operator. In accordance therewith, the following expression is realized, and the expression is stored in the controller 20.

$$It^* = G3 \cdot (\delta h^* - \delta h)$$

Each gain Kg, Kh is set so as to enable optimum control. Each gain Kg, Kh can be regarded as a function of vehicle velocity and increased pursuant to an increase in vehicle velocity V, to enhance stability by increasing the operating torque Th required to operate the operating member 1 at high speeds.

Figure 5:
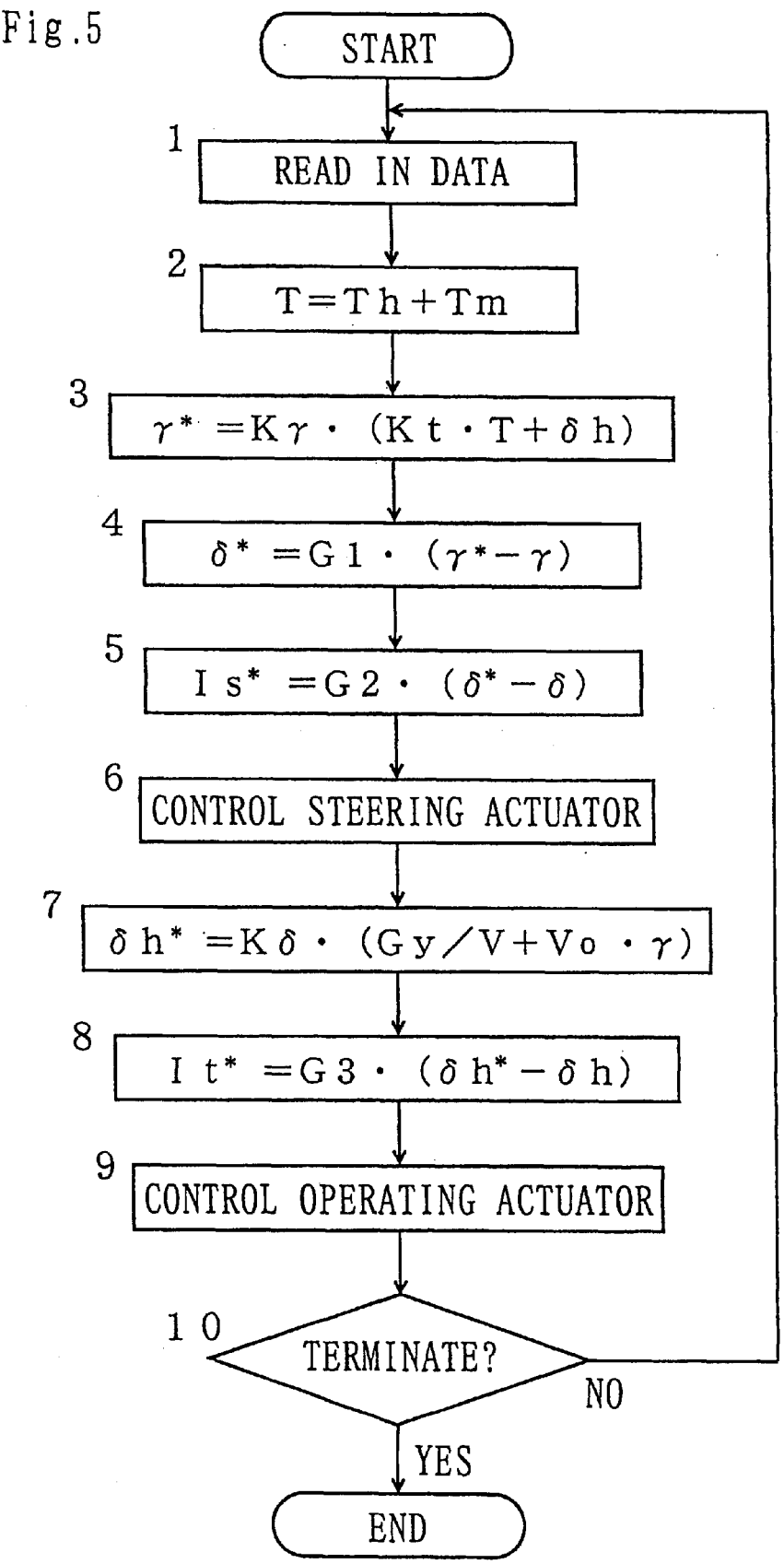
FIG. 5 in a flowchart showing the control procedures of the steering device of the embodiment of the present invention.

The control procedure by the above-mentioned controller 20 is explained by referring to the flowchart of FIG. 5. First, data detected by each sensor is read in (Step 1). Next, a load torque T, which is sum of the determined operating torque Th and control torque Tm, is computed (Step 2). The target yaw rate $\gamma^*$ corresponding to the computed load torque T and determined operating angle $\delta h$ is computed from the stored relationship $\gamma^* = K\gamma \cdot (Kt \cdot T + \delta h)$ (Step 3). The target steering angle $\delta^*$ corresponding to the deviation between the computed target yaw rate γ* and determined yaw rate γ is computed from the stored relationship δ*=G1·(γ*−γ) (Step 4). The target driving current Is* of the steering actuator 2 corresponding to the deviation between the computed target steering angle δ* and determined steering angle δ is computed from the stored relationship Is*=G2·(δ*−δ) (Step 5). The steering actuator 2 is driven in accordance with the target driving current Is* such that the steering angle δ corresponds to the target steering angle δ*. In accordance therewith, the steering actuator 2 is controlled such that the determined yaw rate γ follows the target yaw rate γ* (Step 6). Next, the target operating angle δh* corresponding to the determined yaw rate γ, lateral acceleration Gy and vehicle velocity V is computed from the stored relationship δh*=Kδ·(Gy/V+Vo·γ) (Step 7). The target driving current It* of the operating actuator 19 corresponding to the deviation between the computed target operating angle δh* and determined operating angle δh is computed from the stored relationship It*=G3·(δh*−δh) (Step 8). The control torque Tm is generated by driving the operating actuator 19 in accordance with the target driving current It*. In accordance therewith, the operating actuator 19 is controlled such that the determined operating angle δh follows the computed target operating angle δh* (Step 9). Next, a determination is made as to whether or not to terminate control in accordance with, for example, whether or not the vehicle ignition switch is ON (Step 10), and in a case in which processing is not terminated, processing returns to Step 1.

Examples of settings Kγ, Kδ in the above-mentioned constitution is explained. In a steady turning state, wherein the target yaw rate γ* and actual detected yaw rate γ are identical, and the target operating angle δh* and actual detected operating angle δh are identical, the following expressions (1), (2) are realized from the above-mentioned expressions γ*=Kγ·(Kt·T+δh) and δh*=Kδ·(Gy/V+Vo·γ).

γ=Kγ·(Kt·T+δh)     (1)

δh=Kδ·(Gy/V+Vo·γ)     (2)

Further, in the steady turning state, by treating the spring constant of the elastic member 30 for returning the operating member 1 to a straight-forward steering position as Ks. Because the relationships are approximately T=Ks·δh, Gy/V=γ, if these expressions are substituted for the above-mentioned expressions (1), (2), the following expressions (3), (4) are realized.

γ=Kγ·(Kt·Ks+1)·δh     (3)

δh=Kδ·(Vo+1)·γ     (4)

In accordance therewith, if it is supposed, for example, that Ks=3.183 N·m/rad, Kt=0.5, Vo=1.0, and γ/δh=0.2222, from expressions (3), (4), the settings Kγ=0.0857, Kδ=2.25 are made. In this case, from expression (1), the load torque T, at the time when the operating quantity is π/2rad and the yaw rate is π/9rad/sec, constitutes 5 N·m.

Figure 6:
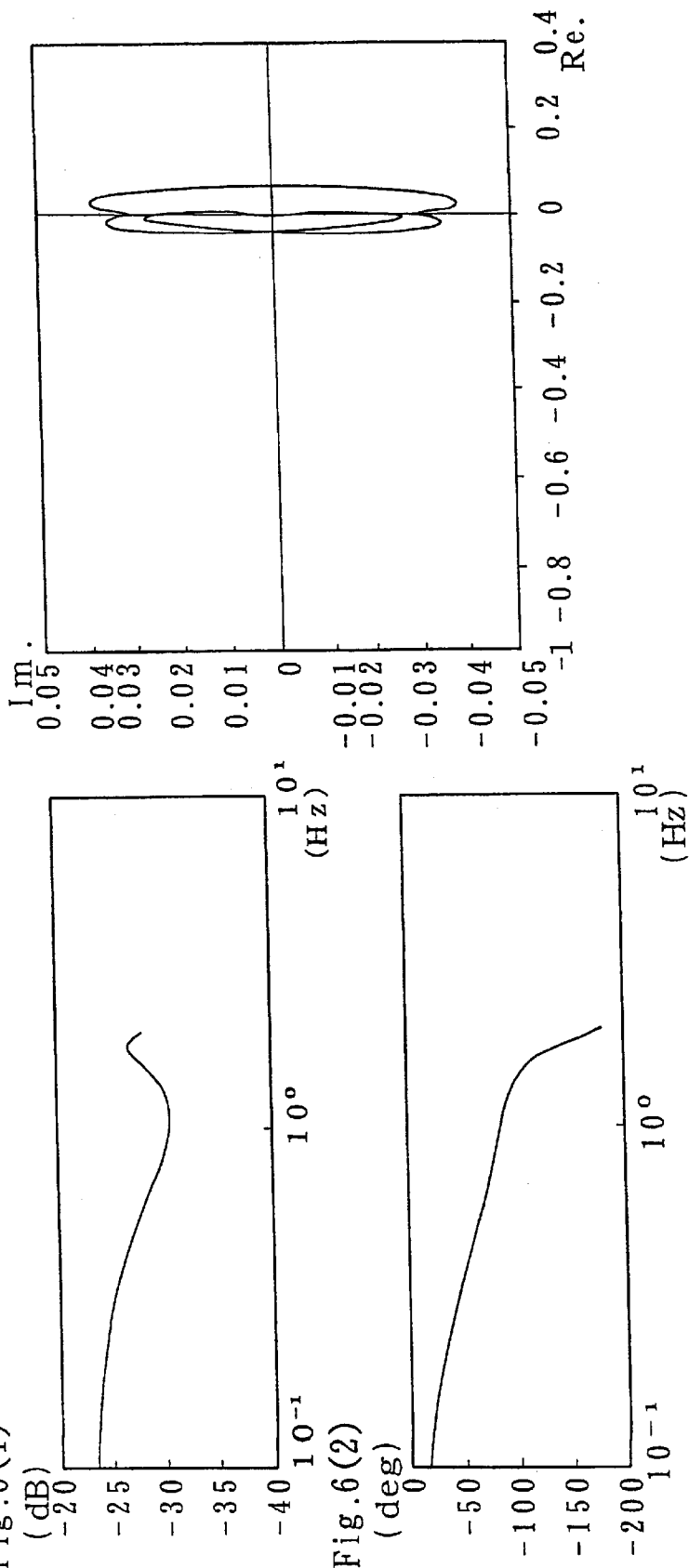
FIG. 6 (1) and FIG. 6 (2) are Bode diagrams showing yaw rate response to operating torque input at a vehicle velocity of 20 km/hour in the steering device of the embodiment of the present invention, and FIG. 6 (3) is a Nyquist diagram.

FIG. 6 (1) to FIG. 8 (3) are Bode diagrams showing one example of frequency response simulation of the yaw rate γ relative to the load torque in the steering device of the above-mentioned constitution, and Nyquist diagrams, wherein FIG. 6 (1) to FIG. 6 (3) show a case in which vehicle velocity is 20 km/hour, FIG. 7 (1) to FIG. 7 (3) show a case in which vehicle velocity is 60 km/hour, and FIG. 8 (1) to FIG. 8 (3) show a case in which vehicle velocity is 100 km/hour.

Here, it is supposed that the inertial moment Im of the operating member 1 is Im=0.04 kg·m², the viscous resistance Cs of the operating member 1 is Cs=1.0 N·m·sec, and the spring constant Ks of the elastic member 30 is Ks=3.183 N·m/rad.

Further, it is supposed that the transfer function G1=Gδ·(0.1+5/s), and that Gδ=0.28 at a vehicle velocity of 20 km/h, Gδ=0.19 at a vehicle velocity of 60 km/h, and Gδ=0.165 at a vehicle velocity of 100 km/h. It is supposed that the transfer function G3=Kt·(3+13/s), and that Kt=0.05 at a vehicle velocity of 20 km/h, Kt=0.6 at a vehicle velocity of 60 km/h, and Kt=1.0 at a vehicle velocity of 100 km/h. Furthermore, it is supposed that there are no delays in the operating actuator 19.

Figure 9:
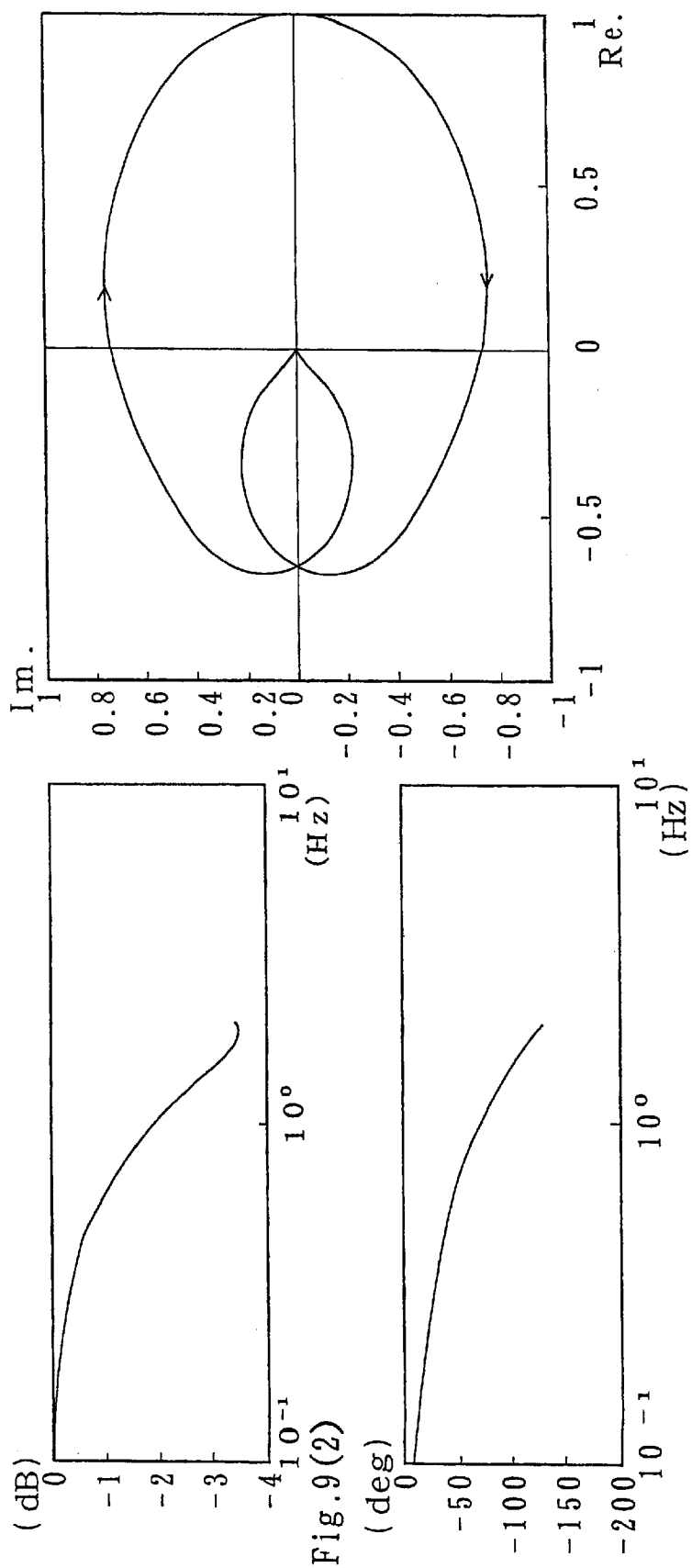
FIG. 9 (1) and FIG. 9 (2) are Bode diagrams showing yaw rate $\gamma$ response to a target yaw rate $\gamma^*$ at a vehicle velocity of 60 km/hour in a simulation model of a comparative example, and FIG. 9 (3) is a Nyquist diagram thereof.
Figure 11:
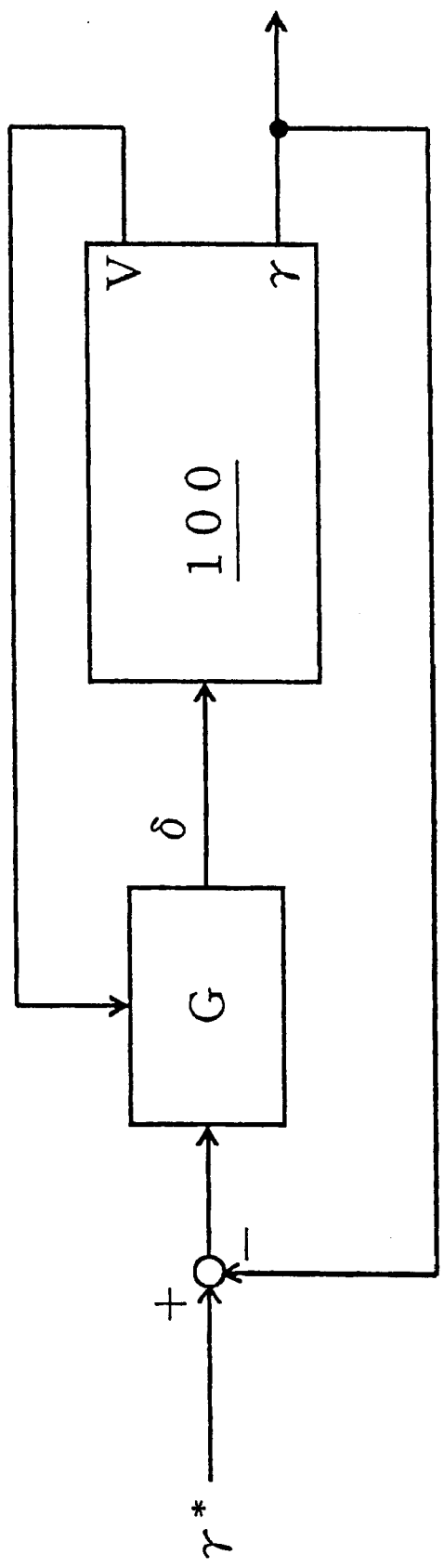
FIG. 11 is a control block diagram of a simulation model of the comparative example.

FIG. 9 (1) to FIG. 9 (3), FIG. 10 (1) to FIG. 10 (3) are Bode diagrams showing one example of frequency response simulation of the yaw rate γ relative to the target yaw rate γ* in the simulation model of the comparative example shown in FIG. 11, and Nyquist diagrams, wherein FIG. 9 (1) to FIG. 9 (3) show a case in which vehicle velocity is 60 km/hour, and FIG. 10 (1) to FIG. 10 (3) show a case in which vehicle velocity is 100 km/hour. In the simulation model, G is the transfer function of the steering angle δ relative to the deviation between the target yaw rate γ* and the actual vehicle yaw rate γ, this transfer function G is set such that proportional integral (PI) control is performed, and here it is supposed that G=0.1+5/s.

If the Bode diagrams of FIG. 6 (1), FIG. 6 (2), FIG. 7 (1), FIG. 7 (2), FIG. 8 (1), and FIG. 8 (2) are compared with the Bode diagrams of FIG. 9 (1), FIG. 9 (2), FIG. 10 (1), and FIG. 10 (2), there is practically no difference between the responsiveness of the yaw rate γ relative to the operating torque Th in a case, in which the target yaw rate γ* is set by controlling the load torque T acting on the operating member 1 on the basis of the present invention, and the responsiveness of the yaw rate γ relative to the target yaw rate γ* in a case, in which the target yaw rate γ* is set without controlling the load torque T acting on the operating member 1. That is, responsiveness is not lowered even though the load torque T acting on the operating member 1 is controlled. Conversely, if the Nyquist diagrams of FIG. 6 (3), FIG. 7 (3) and FIG. 8 (3) are compared with the Nyquist diagrams of FIG. 9 (3) and FIG. 10 (3), stability is enhanced greatly by controlling the load torque T acting on the operating member 1.

Figure 12:
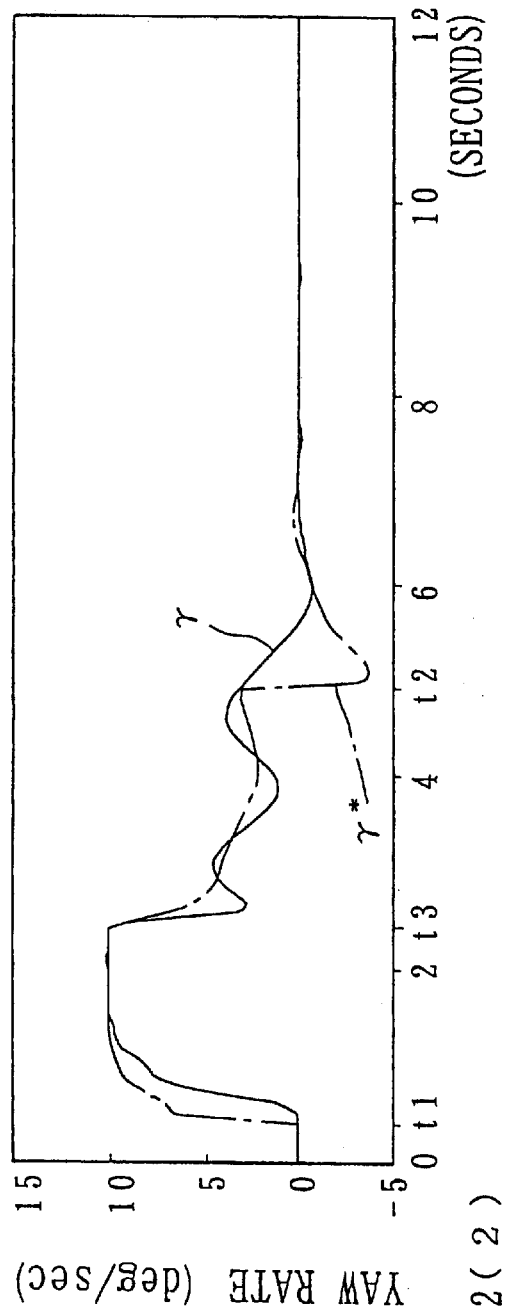
FIG. 12 (1) is a diagram showing changes over time in the yaw rate and the target yaw rate relative to the step input of operating torque in the steering device of the embodiment of the present invention, and FIG. 12 (2) is a diagram showing changes over time ill the steering angle and operating member operating angle relative to the step input of operating torque in the steering device of the embodiment of the present invention.
Figure 12:
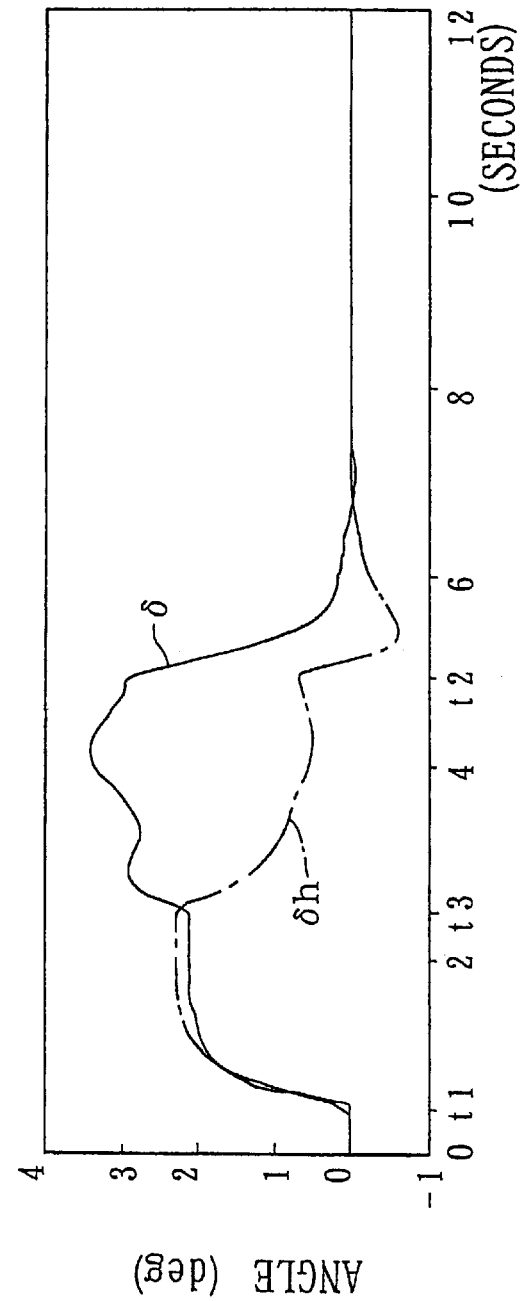
Figure 13:
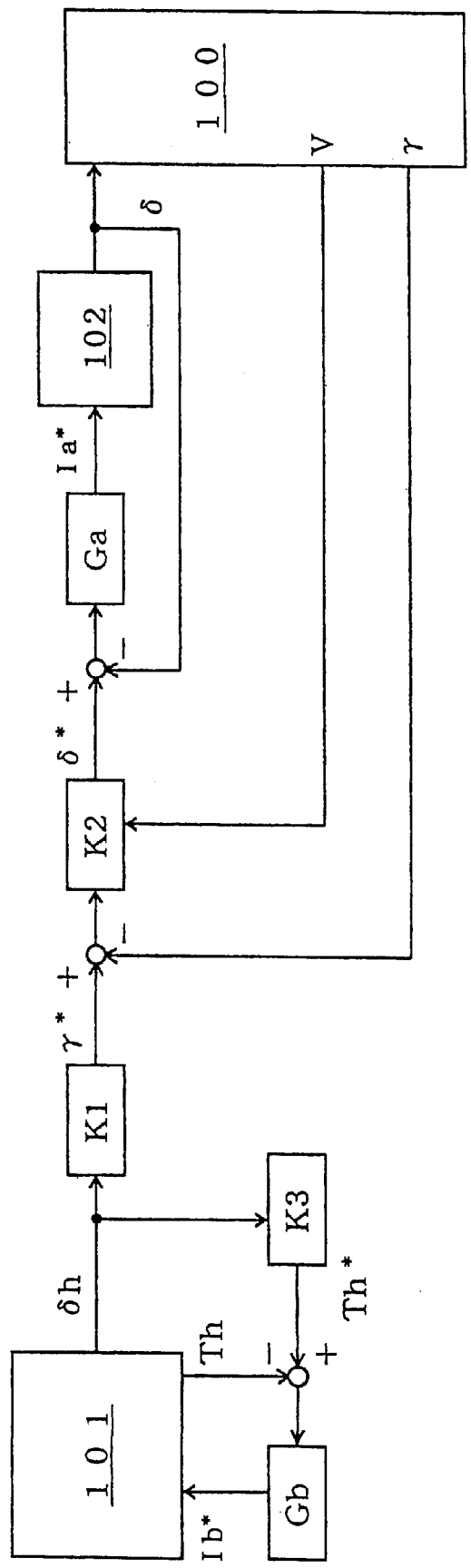
FIG. 13 is a control block diagram of a conventional steering device.
Figure 15:
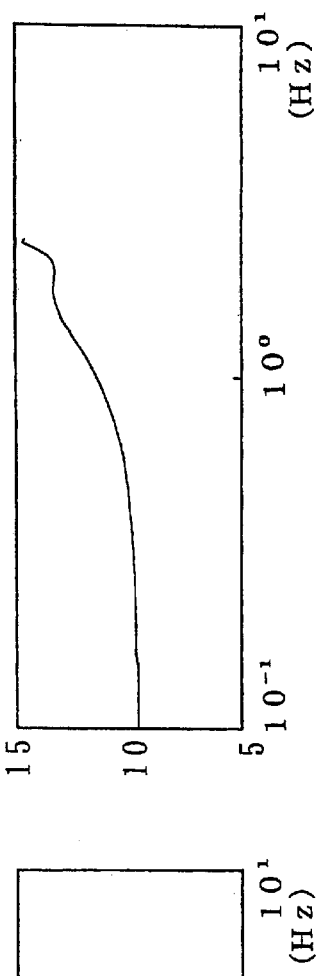
FIG. 15 (1) and FIG. 15 (2) are Bode diagrams showing the response of the yaw rate relative to operating torque input at a vehicle velocity of 20 km/hour in the steering device constituting a conventional steer by electric wire system, and FIG. 15 (3) and FIG. 15 (4) are Bode diagrams showing the response of the yaw rate relative to operating torque input at a vehicle velocity of 20 km/hour in a steering device, in which a steering wheel is mechanically coupled to the wheels.
Figure 15:
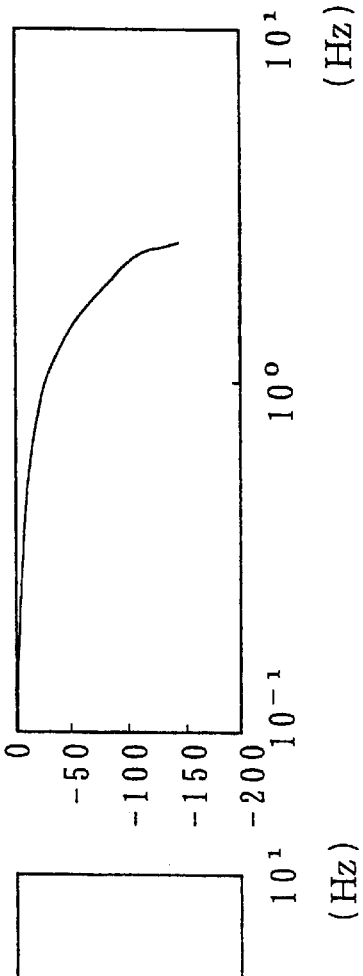
Figure 15:
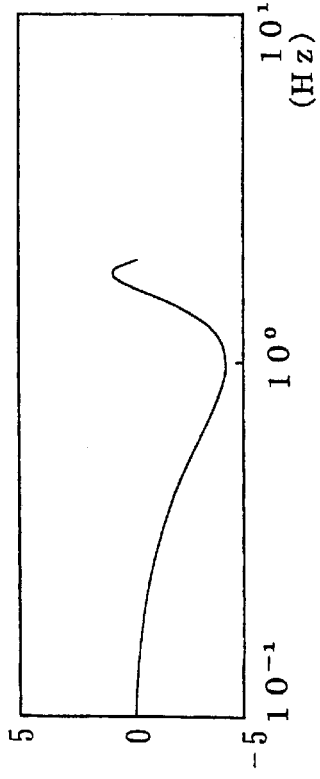
Figure 15:
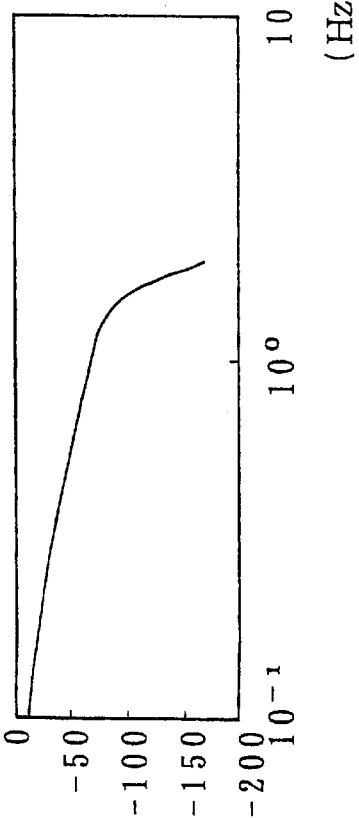

An example of simulation results for the steering device of the above-mentioned constitution is shown by FIG. 12 (1) and FIG. 12 (2), which show changes over time in the yaw rate γ, target yaw rate γ*, steering angle δ and operating angle δh relative to the step input of 2.7 N·m of operating torque Th at timing t1 to t2 (0.5 to 5 seconds) in a vehicle travelling at a velocity of 60 km/hour, and the coefficient of friction between the vehicle and the surface of the road is regarded as 1 up until t3 (2.5 seconds), and is regarded as 0.1 thereafter. It is shown that, when the yaw rate γ drops in accordance with a change in the coefficient of friction, revisions are made such that the operating angle δh becomes smaller by controlling the control torque Tm so as to do away with the deviation between the target operating angle δh* and operating angle δh corresponding to the yaw rate γ, and therefore the steering angle divergence is prevented without increasing the deviation between the yaw rate γ and the target yaw rate γ*.

According to the above-mentioned constitution, the operating angle δh is generated by the operation of operating member 1 in accordance with the load torque T, which is sum of the control torque Tm outputted by the operating actuator 19 and the operating torque Th inputted by the driver. The control torque Tm functions so as to do away with the deviation between the operating angle δh and the target operating angle δh*. Accordingly, in a case in which the operating angle δh does not attain the target operating angle δh*, the control torque Tm functions as an auxiliary force for the operation of the operating member 1, and in a case in which the operating angle δh exceeds the target operating angle δh*, the control torque Tm functions as a reactive force against the operation of the operating member 1.

Further, the steering actuator 2 is controlled such that the yaw rate γ follows the target yaw rate γ* corresponding to the operating angle δh and load torque T. The yaw rate γ and lateral acceleration Gy change by the control of the steering actuator 2. The target operating angle δh* corresponds to the yaw rate γ and lateral acceleration Gy, and the operating angle δh corresponds to the target yaw rate γ*.

Accordingly, in a case in which the yaw rate γ does not attain the target yaw rate γ*, because the operating angle δh exceeds the target operating angle δh*, the reactive force against the operation functions as mentioned hereinabove. In accordance therewith, in a case in which the yaw rate γ does not increase due to a drop in the coefficient of friction between the road surface and the wheels, or due to the tire lateral force having reached its limit even when the operating torque Th is increased, the reactive force against the operation can be made to function. At this time, even if the driver further increases the operating torque Th, the increase in the operating torque Th can be offset by an increase in the reactive force against the operation, and therefore the load torque T acting on the operating member 1 can be maintained approximately constant, and the target yaw rate γ* corresponding to the load torque T and operating angle δh does not increase. That is, because the operating angle δh and load torque T, and in turn the target yaw rate γ* can be held in check by the reactive force against the operation, the divergence of the steering angle δ can be prevented, and vehicle behavior can be stabilized. Further, when a delay occurs in the yaw rate following the target yaw rate due to a delay in the response of the steering actuator 2, because the reactive force against the operation functions as before, it is possible to alleviate the wrong feeling resulting from the delayed response of this steering actuator 2, thus enabling improved steering feel.

Furthermore, the steering device can be controlled with accommodating to vehicle behavior characteristics, such that the yaw rate becomes smaller at low vehicle velocity by making the affect of lateral acceleration greater at low vehicle velocity, and making the affect of the yaw rate greater pursuant to an increase in vehicle velocity, in response to the target operating angle δh*. Furthermore, because the setting value of the vehicle velocity Vc, at the time when the component corresponding to a value arrived at by dividing the lateral acceleration Gy by vehicle velocity V is equal to the component corresponding to a value of the yaw rate γ in the target operating angle δh*, can be changed by changing the crossover velocity Vo, it is possible to control the steering device with accommodating even closer to vehicle behavior characteristics.

The present invention is not limited to the above embodiment. For example, the steering actuator and the operating actuator can be controlled by setting the target operating angle in accordance with the yaw rate alone at a speed greater than a set vehicle velocity, and, in addition, by setting the target steering angle and target operating angle in accordance with the operating angle alone at a speed less than a set vehicle velocity at which the yaw rate is hardly generated.

What is claimed is:

1. A steering device for vehicle, comprising:

an operating member operated by being rotated;

a steering actuator driven in accordance with operation of said operating member;

means for transmitting the movement of said steering actuator to wheels of the vehicle such that steering angle changes in accordance with said movement without mechanically coupling said operating member to the wheels;

an operating actuator for generating control torque, which acts on said operating member;

means for determining load torque, which is sum of said control torque and operating torque exerted on said operating member by a driver;

a sensor for determining operating angle of the operating member which is operated by the action of said load torque;

means for computing target behavior index value of the vehicle, comprising at least target yaw rate corresponding to said determined load torque and operating angle, based on a stored relationship between said load torque, operating angle and target behavior index value;

a sensor for determining a value, comprising at least yaw rate of the vehicle, as a behavior index value corresponding to change of behavior of the vehicle;

means for controlling said steering actuator such that said determined behavior index value follows said target behavior index value;

means for computing target operating angle of said operating member corresponding to said determined behavior index value, based on a stored relationship between said behavior index value and target operating angle; and means for controlling said operating actuator such that said determined operating angle follows said computed target operating angle.

2. The steering device for vehicle according to claim 1, wherein a steering gear is employed as means for transmitting the movement of said steering actuator to the wheels such that the steering angle changes in accordance with said movement.

3. The steering device for vehicle according to claim 1, wherein lateral acceleration and vehicle velocity are determined in addition to the yaw rate as said behavior index value, said target operating angle has a component corresponding to a value arrived at by dividing said lateral acceleration by vehicle velocity, and a component corresponding to the value of the yaw rate, and the ratio of the component corresponding to the value of the yaw rate in said target operating angle changes in accordance with the vehicle velocity.

4. The steering device for vehicle according to claim 3, wherein the setting value of the vehicle velocity, at the time when the component corresponding to a value arrived at by dividing said lateral acceleration by vehicle velocity is equal to the component corresponding to the value of the yaw rate in said target operating angle, can be changed.

* * * * *